United States Patent
Wang et al.

(10) Patent No.: US 6,658,181 B2
(45) Date of Patent: Dec. 2, 2003

(54) POLARIZATION INTERLEAVER

(75) Inventors: Yan Wang, Norcross, GA (US); Yuan P. Li, Duluth, GA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 88 days.

(21) Appl. No.: 10/038,508

(22) Filed: Jan. 2, 2002

(65) Prior Publication Data

US 2003/0123795 A1 Jul. 3, 2003

(51) Int. Cl.[7] .................. G02B 6/12; G02B 6/28; G02B 6/26; G02B 6/42; G02B 6/34
(52) U.S. Cl. .................. 385/37; 385/24; 385/27; 385/14
(58) Field of Search .................. 385/24, 37, 14, 385/27

(56) References Cited

U.S. PATENT DOCUMENTS

| | | | |
|---|---|---|---|
| 4,902,086 A | | 2/1990 | Henry et al. ............. 350/96.12 |
| 6,134,033 A | | 10/2000 | Bergano et al. ............. 359/122 |
| 6,263,127 B1 | | 7/2001 | Dragone et al. ............. 385/24 |
| 6,301,046 B1 | | 10/2001 | Tai et al. .................... 359/498 |
| 6,304,687 B1 | | 10/2001 | Inoue et al. .................. 385/14 |
| 6,374,013 B1 | * | 4/2002 | Whiteaway et al. .......... 385/37 |
| 6,421,478 B1 | * | 7/2002 | Paiam ......................... 385/24 |
| 6,434,292 B1 | * | 8/2002 | Kim et al. .................... 385/24 |
| 6,553,160 B2 | * | 4/2003 | Cao ............................. 385/24 |
| 2002/0126291 A1 | * | 9/2002 | Qian et al. .................. 356/450 |
| 2003/0063849 A1 | * | 4/2003 | Janz et al. ................... 385/27 |
| 2003/0081878 A1 | * | 5/2003 | Joyner et al. ................ 385/14 |
| 2003/0099013 A1 | * | 5/2003 | Su et al. ..................... 359/124 |

OTHER PUBLICATIONS

Y. Inoue et al., "Novel birefringence compensating AWG design," NTT Photonics Laboratories, Japan, copyright Optical Society of America, 2000.

C.H. Henry et al., "Glass Waveguides on Silicon for Hybrid Optical Packaging," *Journal of Lightwave Technology*, vol. 7, No. 10, Oct. 1989, pp. 1530–1539.

* cited by examiner

*Primary Examiner*—John D. Lee
*Assistant Examiner*—Tina M Lin
(74) *Attorney, Agent, or Firm*—Mayer Fortkort & Williams, PC; Stuart H. Mayer, Esq.

(57) ABSTRACT

A method and apparatus provides a WDM optical signal having a plurality of channels with a pair-wise orthogonal polarization state. The method begins by receiving a plurality of unpolarized optical wavelengths defining a plurality of optical channels separated by a prescribed channel spacing. A polarization wavelength dependent shift is imparted to the optical wavelengths, which is substantially equal to a particular fraction of the prescribed channel spacing.

11 Claims, 4 Drawing Sheets

POLARIZATION INTERLEAVER

FIELD OF THE INVENTION

The present invention relates generally to WDM and DWDM communication systems, and more generally to a polarization interleaver employed in such systems.

BACKGROUND OF THE INVENTION

Optical wavelength division multiplexing (WDM) and dense wavelength division multiplexing (DWDM) have gradually become the standard backbone networks for fiber optic communication systems. WDM and DWDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM and DWDM technology.

One approach to increasing fiber optic capacity is to use more closely spaced channels. For example, at one point in time, 200 GHz spacing was common for optical channels. As the state of the art improved, 100 GHz spacing were more commonly used for optical channels. Unfortunately, wavelength division multiplexed transmission systems are susceptible to performance limitations due to polarization dependent effects such as cross-talk between the multiplexed channels. Cross-talk, which is primarily caused by the non-linear index of refraction of optical transmission fibers, increases as the channel spacing decreases. Four-wave mixing is one significant deleterious effect that produces cross-talk.

One way to reduce four-wave mixing while simultaneously increasing spectral efficiency is to launch adjacent channels with orthogonal polarization states. An optical device that can be used to combine two sets of orthogonally polarized channels into one densely packed set with half the channel spacing is referred to as a polarization interleaver. Conventional polarization interleavers typically require a number of components such as multiple wavelength combiners or arrayed waveguide gratings, increasing their complexity and their cost.

Accordingly, it would be desirable to provide a polarization interleaver that requires a minimum number of optical components and which can be produced relatively inexpensively.

SUMMARY OF THE INVENTION

In accordance with the present invention, a method and apparatus provides a WDM optical signal having a plurality of channels with a pair-wise orthogonal polarization state. The method begins by receiving a plurality of unpolarized optical wavelengths defining a plurality of optical channels separated by a prescribed channel spacing. A polarization wavelength dependent shift is imparted to the optical wavelengths, which is substantially equal to a particular fraction of the prescribed channel spacing.

In accordance with one aspect of the invention, the particular fraction of the prescribed channel spacing is approximately equal to one half the prescribed channel spacing.

In accordance with another aspect of the invention, the prescribed channel spacing is uniform across the plurality of optical channels. Alternatively, the prescribed channel spacing may be non-uniform across the plurality of optical channels.

In accordance with yet another aspect of the invention, a polarization interleaver employing an arrayed waveguide grating is provided. The arrayed waveguide grating includes a plurality of input waveguides each for receiving a plurality of unpolarized optical wavelengths defining a plurality of optical channels separated by a prescribed channel spacing. A first free space region is optically coupled to the plurality of input waveguides and a set of arrayed waveguides are optically coupled to the first free space region. A second free space region is optically coupled to the set of arrayed waveguides and an output waveguide is optically coupled to the second free space region. The arrayed waveguide grating has a polarization wavelength dependent shift that is substantially equal to a particular fraction of the prescribed channel spacing. In accordance with another aspect of the invention, the particular fraction of the prescribed channel spacing is approximately equal to one half the prescribed channel spacing.

DETAILED DESCRIPTION

Figure 1:
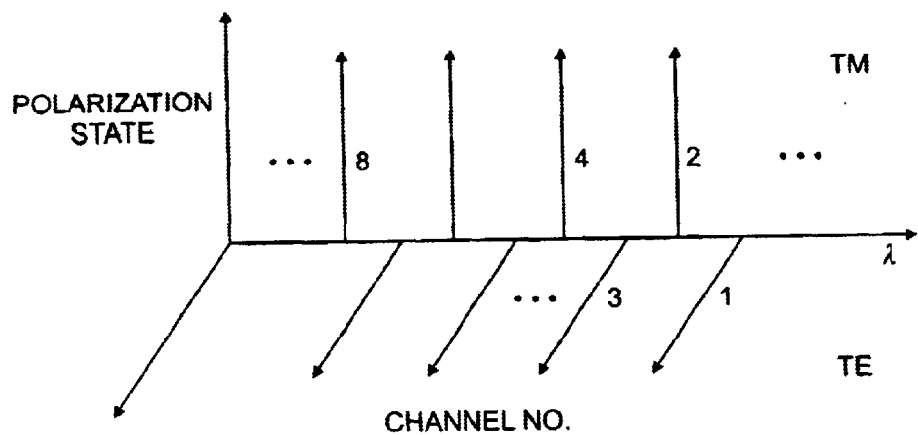
FIG. 1 shows a WDM optical signal in which the channels are pair-wise orthogonally polarized with respect to one another.

In accordance with the present invention, a polarization interleaver is provided in which the odd-numbered channels and the even-numbered channels of its output signal are substantially orthogonal in polarization to one another. FIG. 1 illustrates this orthogonal relationship at some arbitrary instant in time. The preferred substantially orthogonal relationship between the polarization of odd and even-numbered channels advantageously limits the four-wave mixing products that can be generated in the optical transmission path. Referring to FIG. 1, it will be evident that this desirable result is achieved because neighboring channels, for example channel $\lambda_1$ and $\lambda_2$, are substantially precluded from interacting due to their orthogonal polarizations. Channels sharing the same polarization state, for example $\lambda_1$ and $\lambda_3$, are separated far enough apart in wavelength such that the amplitude of resultant mixing products is minimal.

Figure 2:
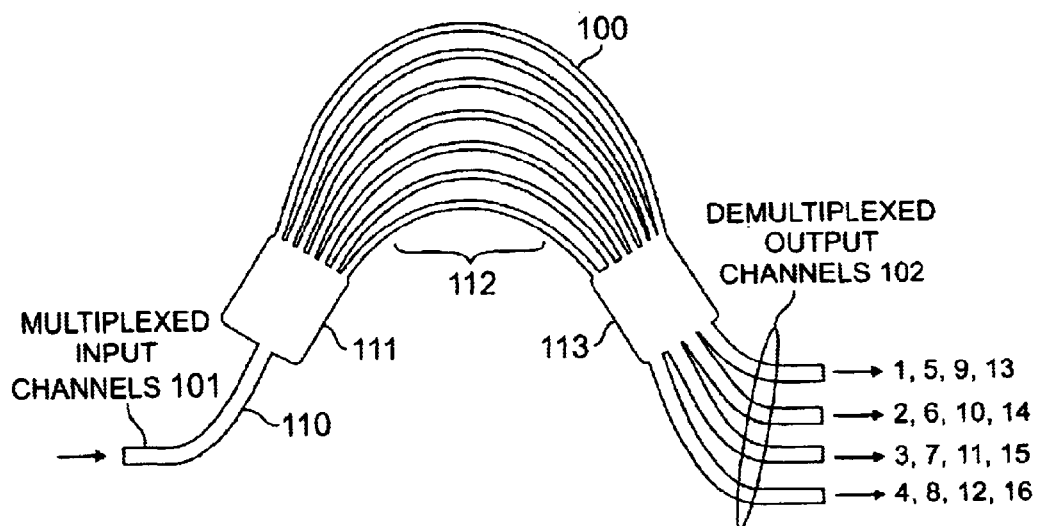
FIG. 2 shows one example of a conventional arrayed waveguide grating.

In accordance with the present invention, the polarization interleaver that produces the output signal depicted in FIG. 1 employs an arrayed waveguide grating (AWG), which consists of two multiport couplers interconnected by an array of waveguides. Broadly speaking, an AWG may be thought of as a device in which multiple copies of the same signal are shifted in phase by different amounts and added together. As shown in FIG. 2, a 1×4 AWG is shown to include an input waveguide 110, a first slab waveguide 111 serving as a free space region 111, a set of arrayed waveguides 112, a second slab waveguide 113 serving as a free space region, and a set of four output waveguides 102. The optical path difference between neighboring waveguides in arrayed waveguides 112 is a constant. To illustrate the functionality of an AWG, assume that an input WDM signal includes four wavelengths 1–4. As shown, the AWR device 100 separates the four wavelengths 1–4 of WDM input signal 101, which are contained within the device's free spectral range (FSR), onto four separate outputs 102. Normally, an AWR is used with a range of wavelengths restricted to lie within the FSR. Now assume that the AWG receives a WDM signal that includes 16 wavelengths, the additional wavelengths being outside of the FSR. In this scenario, since the WDM signal includes 16 wavelengths, the additional wavelengths outside of the FSR are also routed to one of the outputs due to the "wrap-around" property of waveguide routers, as shown in FIG. 3.

Figure 3:
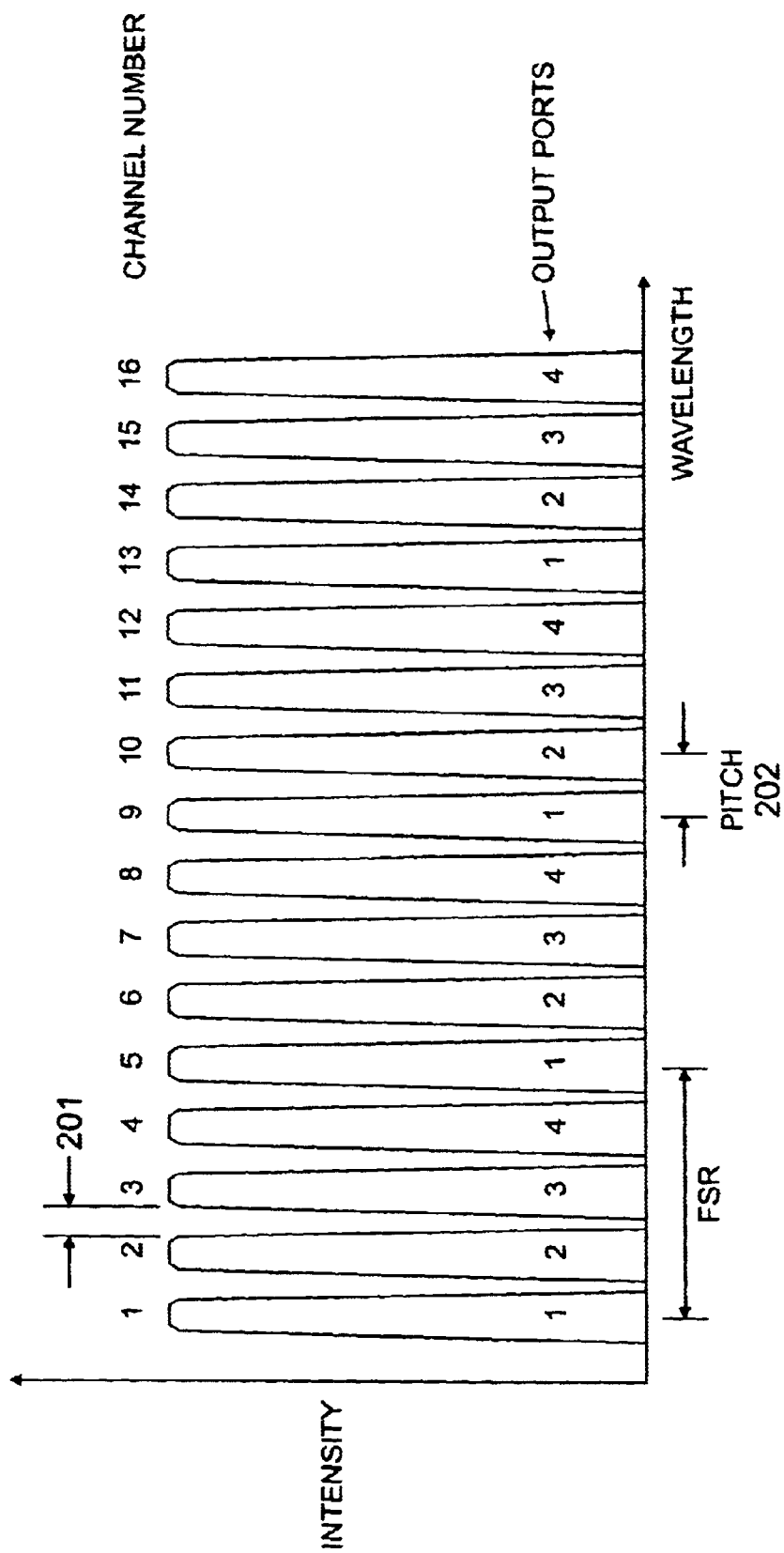
FIG. 3 shows the transmission spectrum produced at the output of the arrayed waveguide grating shown in FIG. 2.

With reference to FIG. 3 there is shown an illustrative graph of the signal intensity transmission level of the 16 wavelengths and how they are cyclically distributed (i.e., how they wrap-around) to the four output channels 102 of the AWR of FIG. 2. As shown, with a broad spectrum WDM input signal including 16 wavelength channels, spanning a wavelength range four times the FSR, each of the 4 output ports would output 4 wavelengths separated by (approximately) one FSR. Thus as shown in FIG. 2, output port 1 includes wavelengths 1, 5, 9, and 13; output port 2 includes wavelengths 2, 6, 10, and 14 and so on. More generally, receiving an input wavelength division multiplexed (WDM) signal having M wavelength channels, where M>1, and a one dimensional array of N outputs 102, where 1<N<M, each output n, where 1[n [N would include channels n, n+N, n+2N, . . . n+{M/N−1}N of the WDM signal. Additional details concerning the AWG shown in FIG. 2 may be found, for example, in U.S. Pat. No. 6,263,127.

In one embodiment of the present invention, the input and output waveguides, the slab waveguides, and the arrayed waveguides of the AWG shown in FIG. 2 may all be fabricated on a single substrate as planar waveguides using Planar Light-Guide Circuit (PLC) technology. A planar lightguide circuit, also known as an optical integrated circuit, can be readily mass produced because the processing steps are compatible with those used in silicon integrated circuit (IC) technology, which are well known and geared for mass production. One common type of planar lightguide circuit employs doped-silica waveguides fabricated with silicon optical bench technology. Doped-silica waveguides are usually preferred because they have a number of attractive properties including low cost, low loss, low birefringence, stability, and compatibility for coupling to fiber. Such a planar lightguide circuit is fabricated on a carrier substrate, which typically comprises silicon or silica. The substrate serves as a mechanical support for the otherwise fragile lightguide circuit and it can, if desired, also play the role of the bottom portion of the cladding. In addition, it can serve as a fixture to which input and output fibers are attached so as to optically couple cores of an input/output fiber to the cores of the planar lightguide circuit. The fabrication process of a PLC begins by depositing a base or lower cladding layer of low index silica on the carrier substrate (assuming the substrate itself is not used as the cladding layer). A layer of doped silica with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. This technology is well known and is generally described, for example, in U.S. Pat. No. 4,902,086 issued to C. H. Henry et al., and in an article entitled "Glass Waveguides on Silicon for Hybrid Optical Packaging" at pp. 1530–1539 of the Journal of Lightwave Technology, Vol. 7, No. 10, October 1989.

It is well known that an AWG may exhibit a polarization sensitivity as a result of its polarization dependence on the wavelength. This so-called polarization dependent wavelength shift (PDW) causes each of the unpolarized transmission peaks shown in FIG. 3 to split into two peaks that represent the two orthogonal polarization states of each channel. Ordinarily, AWGs are designed and manufactured to minimize or reduce the PDW so that the two orthogonal polarization states completely overlap one another.

Figure 4A:
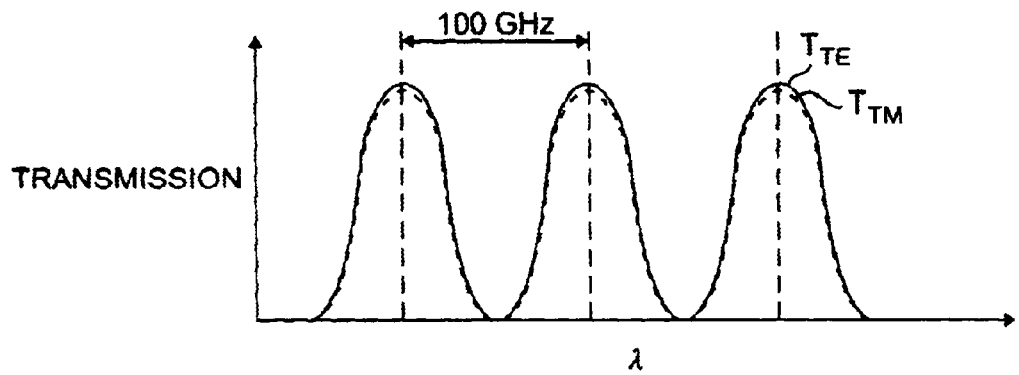
FIG. 4(a) shows the transmission spectrum from an AWG in which the PDW is substantially equal to zero and in which the channel spacing is equal to 100 GHz.
Figure 4B:
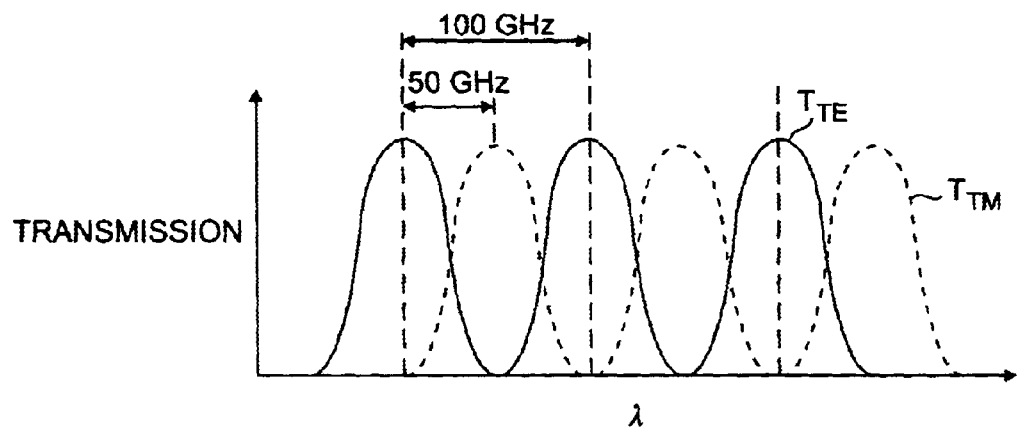
FIG. 4(b) shows the transmission spectrum from an AWG in accordance with the present invention having a PDW of 0.4 nm, which gives rise to orthogonally polarized transmission peaks that are now separated by 50 GHz instead of 100 GHz.

The present inventors have determined that a relatively simple polarization interleaver can be formed from an AWG in which a non-zero PDW is intentionally induced. Specifically, in accordance with the present invention, a PDW is selected that is equal to one half the channel spacing of the signal that is to serve as the input signal to the AWG. In this way the AWG will separate out the orthogonal components of each transmission peak so that one peak will be located halfway between the peak of its orthogonal pair and one member of the pair of the adjacent peak, which is now also separated out into its two components. FIG. 4(a) shows a transmission spectrum from an AWG in which the PDW is substantially equal to zero. In this example, the signal input to the AWG gives rise to channel spacing between the transmission peaks that is equal to 100 GHz. In this case each peak includes two overlapping orthogonal polarization states. In FIG. 4(b) a PDW of 0.4 nm has been imparted to the AWG in a manner that will be discussed below. The orthogonal polarization states of each transmission peak no longer overlap one another. Rather, the transmission peaks corresponding to one polarization state have now been shifted with respect to the transmission peaks of the other polarization state so that adjacent peaks are now separated by 50 GHz instead of 100 GHz. That is, the lightwave in the grating corresponding to one polarization state have been offset by 180 degrees with respect to the lightwave corresponding to the other polarization state, thus giving rise to the signal format depicted in FIG. 1.

Figure 5:
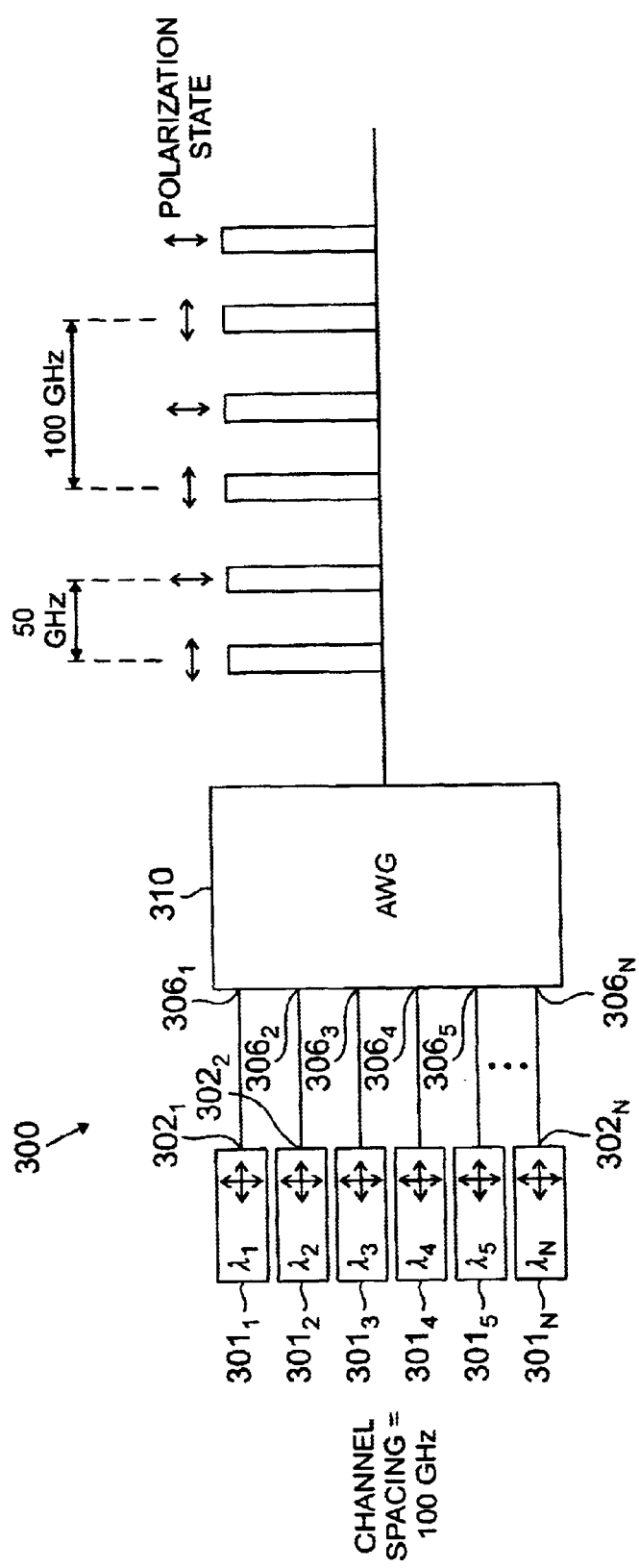
FIG. 5 is a simplified block diagram of an optical polarization interleaver constructed in accordance with the principles of the invention.

FIG. 5 is a simplified block diagram of an optical polarization interleaver 300 constructed in accordance with the principles of the invention. The output from interleaver 300 provides a WDM optical signal such as shown in FIG. 1. As shown, optical transmitter 300 includes a plurality of optical sources $301_1, 301_2, \ldots 301_N$. The plurality of optical sources $301_1, 301_2, \ldots 301_N$ which could be, for example, wavelength-tunable semiconductor lasers, are utilized to generate a plurality of continuous-wave optical signals $302_1, 302_2, \ldots 302_N$ each having a different wavelength $\lambda_1, \lambda_2, \ldots \lambda_N$, respectively, thus defining a plurality of N optical channels. Optical signals $302_1, 302_2, \ldots 302_N$ are unpolarized. That is, optical signals $302_1, 302_2, \ldots 302_N$ include all states of polarization. Optical sources $301_1, 301_2, \ldots 301_N$ may be adapted such that optical channels $302_1, 302_2, \ldots 302_N$ have substantially identical optical power. One or more of the optical sources $301_1, 301_2, \ldots 301_N$ may be adapted so that optical channels 302 carry information supplied by data sources (not shown) using conventional techniques. For discussion purposes only and not as a limitation on the invention, the channels may be sequentially numbered 1, 2, ... N, from lowest to highest wavelength. In this illustrative example of the invention the channel wavelengths are uniformly spaced by, for example, 100 GMz. However, in other applications of the invention it may be desirable to utilize a non-uniform channel wavelength spacing.

Optical signals $302_1$, $302_2$, ... $302_N$ are respectively coupled to the inputs $306_1$, $306_2$, ... $306_N$ of AWG 310. As shown, AWG 310 has N inputs and 1 output. As previously mentioned, AWG 310 has a PDW that is equal to one half the channel spacing of the signal that is to be input to the AWG 310. As a result, AWG 310 provides an output signal 312 in which the channels have a pair-wise orthogonal relationship. Moreover, the channel spacing is equal to one half the channel spacing between the input optical signals $302_1$, $302_2$, ... $302_N$. For example, if, as shown, the channel spacing between the input optical signals $302_1$, $302_2$, ... $302_N$ is 100 GMz then the output signal 312 has a channel spacing equal to 50 GMz.

The desired PDW may be imparted to AWG 310 in a variety of different ways. For example, as discussed in Y. Inoue et al., "Novel Birefringence Compensating AWG Design," a non-zero PDW can be achieved when the integrated birefringence along each of the arrayed waveguides in AWG 310 differs from one another by an appropriate amount. As is well known, the birefringence can be controlled by adjusting the stress distribution along the arrayed waveguides. For instance, in silica-based waveguides fabricated using PLC technology, the birefringence increases with increasing core width. Of course, the birefringence can be adjusted during the fabrication process of the AWG by other means that are known to those of ordinary skill in the art.

What is claimed is:

1. A polarization interleaver employing an arrayed waveguide grating, said arrayed waveguide grating comprising:

a plurality of input waveguides each for receiving a plurality of unpolarized optical wavelengths defining a plurality of optical channels separated by a prescribed channel spacing;

a first free space region optically coupled to the plurality of input waveguides;

a set of arrayed waveguides optically coupled to the first free space region;

a second free space region optically coupled to the set of arrayed waveguides; and an output waveguide optically coupled to the second free space region, wherein said arrayed waveguide grating has a polarization wavelength dependent shift that is substantially equal to a particular fraction of the prescribed channel spacing.

2. The polarization interleaver of claim 1 wherein said particular fraction of the prescribed channel spacing is approximately equal to one half the prescribed channel spacing.

3. The polarization interleaver of claim 1 wherein the prescribed channel spacing is uniform across the plurality of optical channels.

4. The polarization interleaver of claim 1 wherein the prescribed channel spacing is nonuniform across the plurality of optical channels.

5. The polarization interleaver of claim 4 wherein said input waveguides, output waveguide, and said arrayed waveguides are planar waveguides.

6. The polarization interleaver of claim 5 wherein said input waveguides, said output waveguide, said first and second free space regions, and said arrayed waveguides are formed on a common substrate.

7. The polarization interleaver of claim 1 further comprising a plurality of optical sources each generating an optical signal having a different wavelength, said plurality of optical sources being optically coupled to the plurality of input waveguides, respectively.

8. A method of providing a WDM optical signal having a plurality of channels with a pair-wise orthogonal polarization state, comprising:

receiving a plurality of unpolarized optical wavelengths defining a plurality of optical channels separated by a prescribed channel spacing; and imparting a polarization wavelength dependent shift to the optical wavelengths that is substantially equal to a particular fraction of the prescribed channel spacing.

9. The method of claim 8 wherein said particular fraction of the prescribed channel spacing is approximately equal to one half the prescribed channel spacing.

10. The method of claim 8 wherein the prescribed channel spacing is uniform across the plurality of optical channels.

11. The method of claim 8 wherein the prescribed channel spacing is non-uniform across the plurality of optical channels.

* * * * *

UNITED STATES PATENT AND TRADEMARK OFFICE
CERTIFICATE OF CORRECTION

PATENT NO. : 6,658,181 B2
DATED : December 2, 2003
INVENTOR(S) : Yan Wang et al.

It is certified that error appears in the above-identified patent and that said Letters Patent is hereby corrected as shown below:

Column 3,
Line 8, before "device", change "AWR" to -- AWG --.
Line 11, after "an", change "AWR" to -- AWG --.
Line 23, after "the", change "AWR" to -- AWG --.

Column 5,
Line 3, after "100", change "GMz" to -- GHz --.
Line 17, after "100", change "GMz" to -- GHz --.
Line 18, after "50", change "GMz" to -- GHz --.

Signed and Sealed this

Sixth Day of April, 2004

JON W. DUDAS
*Acting Director of the United States Patent and Trademark Office*